United States Patent
Chung (10) Patent No.: US 9,097,521 B2
(45) Date of Patent: Aug. 4, 2015

(54) DISTANCE MEASUREMENT APPARATUS AND METHOD

(75) Inventor: Il Kwon Chung, Gyunggi-do (KR)

(73) Assignee: SAMSUNG ELECTRO-MECHANICS CO., LTD., Suwon (KR)

( * ) Notice: Subject to any disclaimer, the term of this patent is extended or adjusted under 35 U.S.C. 154(b) by 176 days.

(21) Appl. No.: 13/556,796

(22) Filed: Jul. 24, 2012

(65) Prior Publication Data

US 2013/0308119 A1 Nov. 21, 2013

(30) Foreign Application Priority Data

May 16, 2012 (KR) ........................ 10-2012-0051833

(51) Int. Cl.
*G01C 3/08* (2006.01)
(52) U.S. Cl.
CPC ....................................... *G01C 3/08* (2013.01)
(58) Field of Classification Search
CPC ........ G01C 3/08; G01B 11/00; G01B 11/024; G01B 2290/65
USPC ............ 356/3.01–28.5, 3.01–3.15, 4.01–4.1, 356/5.01–5.15, 6–22
See application file for complete search history.

(56) References Cited

U.S. PATENT DOCUMENTS

| | | | |
|---|---|---|---|
| 7,551,771 B2 | 6/2009 | England, III | |
| 2003/0043058 A1* | 3/2003 | Jamieson et al. | 340/961 |
| 2007/0165246 A1* | 7/2007 | Kimmel | 356/610 |
| 2010/0182587 A1* | 7/2010 | Fluckiger | 356/4.01 |
| 2010/0303299 A1 | 12/2010 | Cho et al. | |
| 2012/0038903 A1* | 2/2012 | Weimer et al. | 356/4.07 |

FOREIGN PATENT DOCUMENTS

| | | |
|---|---|---|
| JP | 07-198850 | 8/1995 |
| JP | 2009-204691 | 9/2009 |
| KR | 10-2010-0128797 | 12/2010 |
| KR | 10-2011-0112813 | 10/2011 |
| WO | WO 2010/076775 | 7/2010 |

OTHER PUBLICATIONS

Korean Office Action mailed Jan. 9, 2014 in corresponding Korean Application No. 10-2012-0051833.
Korean Office Action issued on Jul. 24, 2013 in corresponding Korean Patent Application No. 10-2012-0051833.

* cited by examiner

*Primary Examiner* — Luke Ratcliffe (57) ABSTRACT

There are provided a distance measurement apparatus and a distance measurement method, the distance measurement apparatus including: a light source outputting light; a switch array including a plurality of cells, and controlling a position at which the light output from the light source is irradiated, by switching operations of the respective cells; a light detector sensing the light reflected from a target object; and a controller sequentially controlling the switching operations of the plurality of cells of the switch array, wherein the controller generates distance information between the light source and the target object based on the light sensed by the light detector. The light detector including a single cell light detector element may be used, to thereby reduce the costs.

14 Claims, 6 Drawing Sheets

| $C_{11}$ | $C_{12}$ | $C_{13}$ | | | $C_{1n-2}$ | $C_{1n-1}$ | $C_{1n}$ |
|---|---|---|---|---|---|---|---|
| $C_{21}$ | $C_{22}$ | | | | | $C_{2n-1}$ | $C_{2n}$ |
| $C_{31}$ | | | | | | | $C_{3n}$ |
| | | | | | | | |
| | | | | | | | |
| $C_{n-2}C_1$ | | | | | | | $C_{n-2}C_n$ |
| $C_{n-1}C_1$ | $C_{n-1}C_2$ | | | | | $C_{n-1n-1}$ | $C_{n-1}C_n$ |
| $C_{n1}$ | $C_{n2}$ | $C_{n3}$ | | | $C_{nn-2}$ | $C_{nn-1}$ | $C_{nn}$ |

FIG. 4

|    |    |   |   |   |   |   |   |
|----|----|---|---|---|---|---|---|
| 10 | 8  | 6 | 4 |   |   |   |   |
| 8  | 6  | 4 |   |   |   |   |   |
| 6  | 4  |   |   |   |   |   |   |
| 4  |    |   |   |   |   |   |   |
|    |    |   |   |   |   |   |   |
|    |    |   |   |   |   |   |   |
|    |    |   |   |   |   |   |   |
|    |    |   |   |   |   |   |   |

DISTANCE MEASUREMENT APPARATUS AND METHOD

CROSS-REFERENCE TO RELATED APPLICATIONS

This application claims the priority of Korean Patent Application No. 10-2012-0051833 filed on May 16, 2012, in the Korean Intellectual Property Office, the disclosure of which is incorporated herein by reference.

BACKGROUND OF THE INVENTION

1. Field of the Invention

The present invention relates to a distance measurement apparatus and method by using a single cell sensor.

2. Description of the Related Art

In the related art, a time-of-flight (TOF) sensor including a plurality of cells has been used in order to recognize distances and the motion of objects in space. The TOF sensor senses light, emitted from an infrared ray (IR) light source and reflected and returned thereto. The TOF sensor is connected to a depth camera generating depth information to be used to calculate a distance to a specific object. The calculation of distance is carried out by two sensors generally including a plurality of cells. The two sensors are sequentially switched on and off, to thereby measure the distance to a specific object. However, the respective cells of two distance sensors comprise a pair, to thereby be complementarily controlled, which may lead to an increase in the sizes of the cells. In addition, a distance sensor including a plurality of cells may increase manufacturing costs and a product unit price, as compared with a distance sensor including a single cell.

Patent Document 1 of the following Related Art Documents is directed to a distance sensor, a three-dimensional image sensor, and a distance calculating method. According to Patent Document 1, the light source is periodically switched on and off to thereby periodically transmit light to a target object; the light reflected from the target object is received by a light detector; and the points in time at which the reflected fragments of light received by the light detector are detected are differentiated from each other according to a plurality of light detecting devices provided in the light detector, so that the distance to the target object is calculated by the maximum charge amount among the charge amounts detected based on different sensing points in time.

Patent Document 2 of the following Related Art Documents is directed to a gate type 3D camera determining a distance to a target object, and includes a light source including a series of pulses of light having a characteristic spectrum controlled to illuminate the target object; a photosensitive surface including a plurality of light detecting devices; an optical instrument visually displaying reflected light on the photosensitive surface; and a shutter operable to selectively switch the photosensitive surface for light in the spectrum on and off.

Patent Documents 1 and 2 of the Related Art Documents have an effect of decreasing the size of cells by using a single distance sensor, as compared with the related art. That is, the problem in which the size of cells is increased was solved. However, Patent Documents 1 and 2 of the Related Art Documents, which employ the distance sensor including a plurality of cells, did not solve the limitations of increasing manufacturing costs and manufacturing costs per unit as compared with the distance sensor including a single distance sensor.

RELATED ART DOCUMENTS (Patent Document 1) Korean Patent Laid-Open Publication No. KR 10-2010-0128797

(Patent Document 2) Korean Patent Laid-Open Publication No. KR 10-2011-0112813

SUMMARY OF THE INVENTION

An aspect of the present invention provides a distance measurement apparatus capable of lowering manufacturing costs and manufacturing costs per unit by using a distance sensor including a single cell.

According to an aspect of the present invention, there is provided a distance measurement apparatus, the apparatus including: a light source outputting light; a switch array including a plurality of cells, and controlling a position at which the light output from the light source is irradiated, by switching operations of the respective cells; a light detector sensing the light reflected from a target object; and a controller sequentially controlling the switching operations of the plurality of cells of the switch array, wherein the controller generates distance information between the light source and the target object based on the light sensed by the light detector.

The controller may control the light source to be periodically switched on and off.

The controller may synchronize the switching operations of the plurality of cells of the switch array with an on and off operation of the light source, based on the on and off operation of the light source.

The controller may generate the distance information based on a travel time of the light output from the light source and sensed by the light detector.

The controller may generate a plurality of pieces of distance information based on a series of travel times of fragments of light output from the light source and sequentially sensed by the light detector and switching operation information of the plurality of cells of the switch array.

The controller may convert the plurality of pieces of distance information into matrix-type distance information corresponding to the plurality of cells of the switch array.

The controller may express the matrix type distance information by using a predetermined gray scale corresponding to individual pieces of distance information among the plurality of pieces of distance information.

According to another aspect of the present invention, there is provided a distance measurement method, the method including: outputting light from a light source; sequentially controlling switching operations of a plurality of cells of a switch array; and sensing, by a light detector, light reflected from a target object, wherein the switch array controls a position at which the light output from the light source is irradiated, by the switching operations of the respective cells, and wherein in the controlling, a piece of distance information between the light source and the target object is generated based on the light sensed by the light detector.

Here, in the controlling, the light source may be controlled to be periodically switched on and off.

Here, in the controlling, the switching operations of the plurality of cells of the switch array may be synchronized with the on and off operation of the light source, based on the on and off operation of the light source.

Here, in the controlling, a piece of distance information may be generated based on a travel time of the light output from the light source and sensed by the light detector.

Here, in the controlling, a plurality of pieces of distance information may be generated based on a series of travel times of the fragments of light output from the light source and sequentially sensed by the light detector and switching operation information of the plurality of cells of the switch array.

Here, in the controlling, the plurality of pieces of distance information may be converted into matrix-type distance information corresponding to the plurality of cells of the switch array.

Here, in the controlling, the matrix type distance information may be expressed by using a predetermined gray scale corresponding to individual pieces of distance information among the plurality of pieces of distance information.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE EMBODIMENTS

Embodiments of the present invention will be described in detail with reference to the accompanying drawings. These embodiments will be described in detail for those skilled in the art in order to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be changed without departing from the spirit and the scope of the present invention. Therefore, the detailed description described below should not be construed as a restrictive meaning. The scope of the present invention is limited only by the accompanying claims and their equivalents, if they are appropriately described. The similar reference numerals will be used to describe the same or similar function throughout the accompanying drawing.

Hereinafter, embodiments of the present invention will be described in detail with reference to the accompanying drawings so that those skilled in the art may easily practice the present invention.

Figure 1:
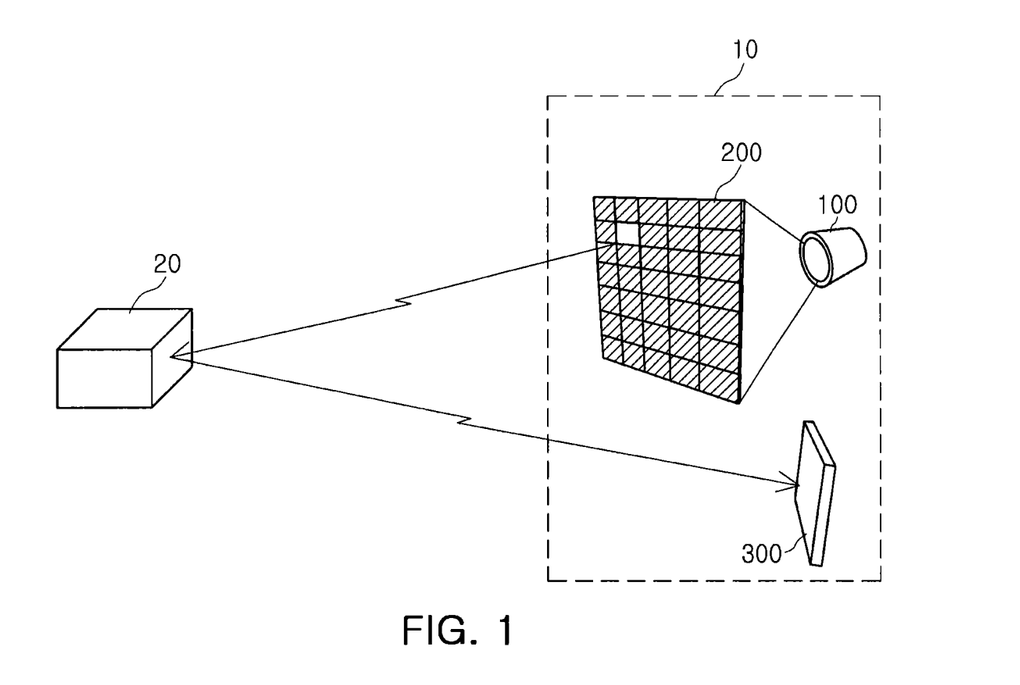
FIG. 1 is a conceptual diagram schematically showing a distance measurement apparatus according to an embodiment of the present invention.

FIG. 1 is a conceptual diagram schematically showing a distance measurement apparatus according to an embodiment of the present invention.

Referring to FIG. 1, a distance measurement apparatus 10 according to an embodiment of the present invention may include a light source 100 outputting light, a switch array 200 including a plurality of cells and controlling a position at which the light output from the light source is irradiated, by switching operations of the respective cells, and a light detector 300 sensing the light reflected from a target object 20 (a controller 400 is not shown).

Specifically, the light source 100 may output the light, and the switch array 200 including the plurality of cells may be positioned on a movement route of the light output from the light source 100. A laser diode (LD) or light emitting diode (LED) may be used as the light source, but other kinds of light sources may be used. An infrared ray (IR) wavelength may be normally used as a wavelength of the light source, but other wavelengths may be used. The switch array 200 may be positioned at a distance at which the light output from the light source 100 is uniformly output to the switch array 200.

The plurality of cells of the switch array 200 may allow the light from the light source 100 to pass therethrough when the cells are opened, and may block the light from the light source 100 when the cells are closed. When one of the plurality of cells of the switch array 200 is opened, the other cells are closed.

The light passing through the switch array 200 and reflected from the target object 20 may be sensed by the light detector 300, which is a distance sensor including a single cell. The distance sensor including a single cell may lead to a decrease in manufacturing costs and manufacturing costs per unit as compared with a distance sensor including a plurality of cells.

Figure 2:
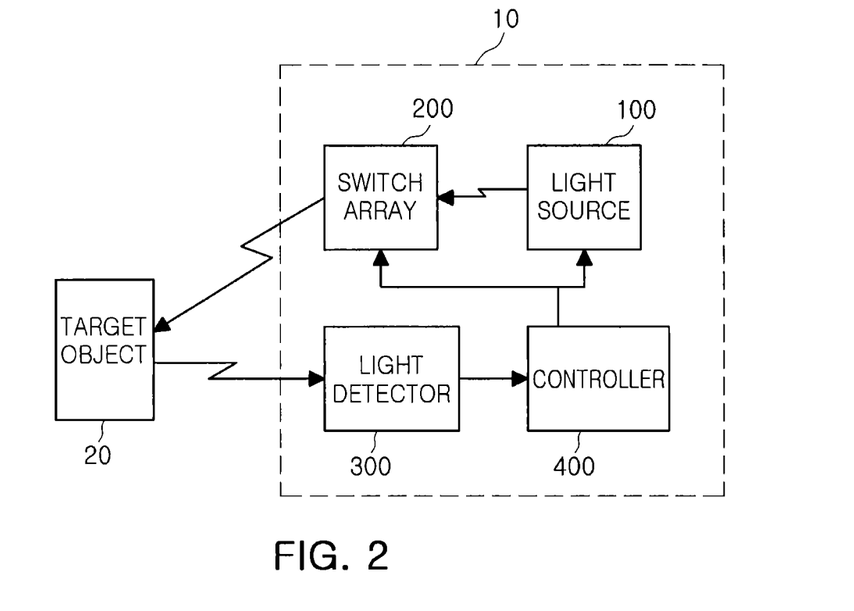
FIG. 2 is a block diagram showing a distance measurement apparatus according to an embodiment of the present invention.

FIG. 2 is a block diagram showing a distance measurement apparatus 10 according to an embodiment of the present invention. Referring to FIG. 2, the distance measurement apparatus 10 according to the embodiment of the present invention may include: a light source 100 outputting light; a switch array 200 including a plurality of cells, and controlling a position at which the light output from the light source 100 is irradiated, by switching operations of the respective cells; a light detector 300 sensing the light reflected from a target object 20; and a controller 400 sequentially controlling switching operation of the plurality of cells of the switch array 200. Here, the controller 400 may generate distance information between the light source 100 and the target object 20 based on the light sensed by the light detector 300.

Specifically, the light source 100 of the distance measurement apparatus 10 outputs the light, and the position at which the light output from the light source 100 is irradiated may be controlled by switching operations of the plurality of cells of the switch array 200.

The controller 400 may control the light source 100 and the switch array 200. The controller 400 may control the light source 100 to be periodically switched on and off. The light source 100 may output a pulse type light by control of the controller 400.

In addition, the controller 400 may control the switching operations of the plurality of cells of the switch array 200. The controller 400 may control the plurality of cells of the switch array 200 to be sequentially switched on and off, to thereby control the position at which the light is irradiated.

In addition, the controller 400 may synchronize the switching operations of the plurality of cells of the switch array 200 with the on and off operation of the light source 100, based on the on and off operation of the light source 100. The synchronizing of the on and off operation of the light source 100 with the switching operations of the plurality of cells of the switch array 200 may be performed such that the switching on and off operations of the plurality of cells of the switch array 200 are delayed for the amount of time calculated by dividing a separated distance between the light source 100 and the switch array 200 by the speed of light.

The light passing through the switch array 200 and reflected from the target object 20 is sensed by the light detector, which is a distance sensor including a single cell. The distance sensor including a single cell may lead to a decrease in manufacturing costs and manufacturing costs per unit as compared with a distance sensor including a plurality of cells.

The controller 400 may generate distance information between the light source 100 and the target object 20 based on the light sensed by the light detector 300. That is, the controller 400 may generate the distance information by multiplying the travel time of the light output from the light source 100 and sensed by the light detector 300 by the speed of light.

In addition, the controller 400 may generate a plurality of pieces of distance information based on on and off switching operation information of the plurality of cells of the switch array 200 and a series of travel times of the fragments of light output from the light source 100 and sequentially sensed by the light detector 300. In addition, information about a shape of the target object may be obtained from the plurality of pieces of distance information. In addition, in the case where the operations of the plurality of cells of the switch array 200 are sequentially and repeatedly controlled, information about motion of the target object may be obtained.

Figure 3:
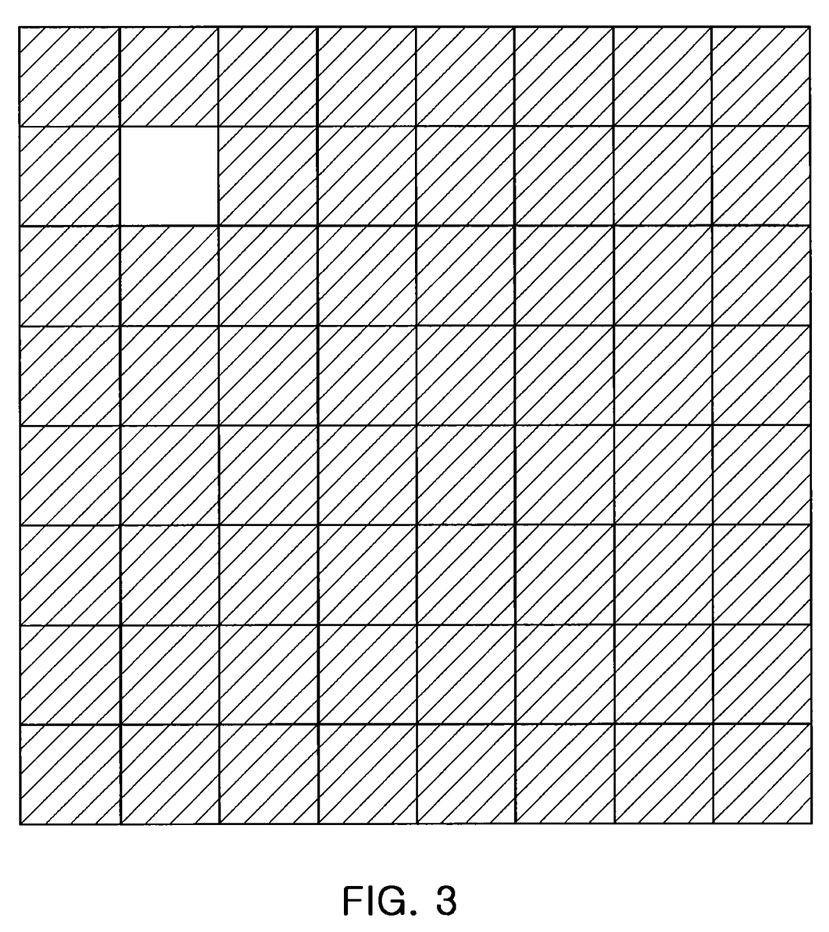
FIG. 3 is a view showing a switch array including a plurality of cells an embodiment of the present invention.

FIG. 3 is a view showing the switch array including a plurality of cells according to an embodiment of the present invention.

Referring to FIG. 3, the switch array 200 may include a plurality of cells (n×n=$n^2$). However, the plurality of cells of the switch array 200 may be in a type of n×m (here, n≠m) but not in a type of n×n.

The switching operations of the plurality of cells of the switch array 200 may be sequentially carried out by control of the controller 400. In addition, as described above, the switching operations of the plurality of cells of the switch array 200 may be synchronized with the on and off operation of the light source 100 by control of the controller 400.

Figure 4:
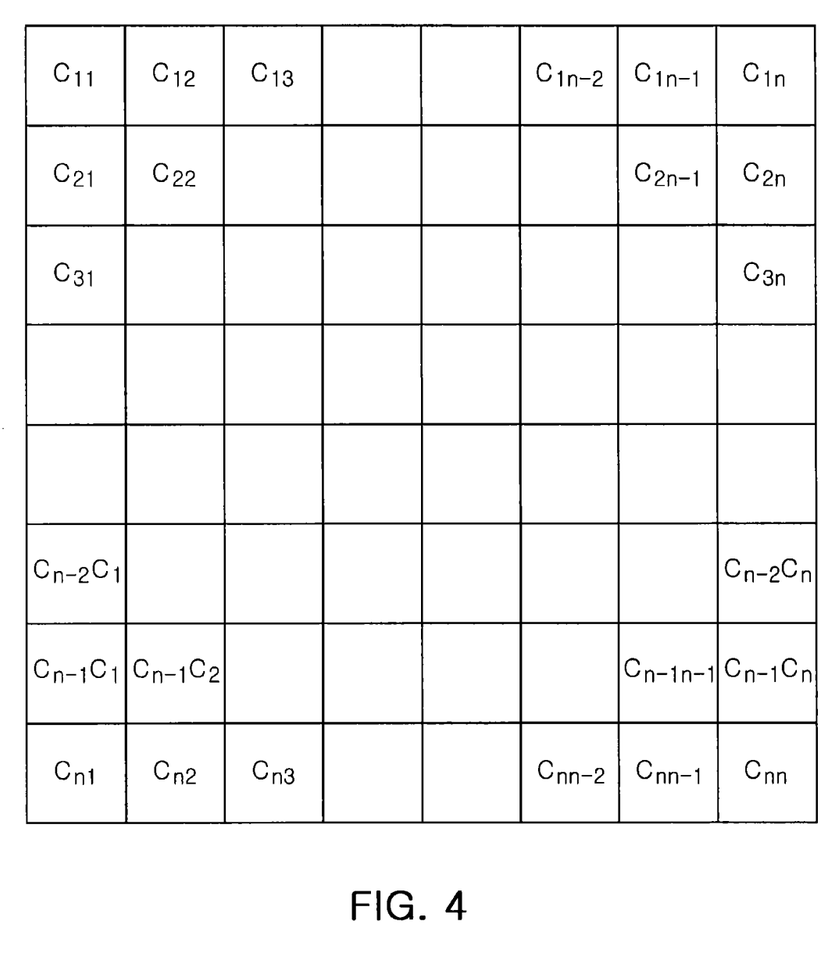
FIG. 4 is a view showing a switching operation of the switch array including a plurality of cells according to an embodiment of the present invention.

FIG. 4 is a view showing a switching operation of the switch array including a plurality of cells according to an embodiment of the present invention.

FIG. 4 shows a case in which Cell C22, one of the plurality of cells of the switch array, is opened and the other cells are closed. In the case in which Cell C22 is opened and the other cells are closed, the light output from the light source 100 passes through Cell C22 to thereby be irradiated to the front, and the light output to the other cells except for Cell C22 is blocked.

The plurality of cells of the switch array 200 may be sequentially switched on and off by the controller 400. The switching operations may be controlled in a sequence of C11, C12, C13, ..., Cln−2, Cln−1, and Cln of FIG. 4. However, the switching operations are not limited to the above controlling, but may be controlled in other directions and operations.

In addition, the controller 400 may generate a plurality of pieces of distance information based on on and off switching operation information of the plurality of cells of the switch array 200 and a series of travel times of the fragments of light output from the light source 100 and sequentially sensed by the light detector 300.

Referring to FIGS. 3 and 4, in the case in which Cell C11 is opened and the other cells are closed, the controller 400 may generate distance information corresponding to Cell C11, based on ON information of Cell C11 and the travel time of the light sensed by the light detector 300. In addition, in the case in which the controller 400 controls Cell C12 to be ON and the other cells to be closed, the controller 400 may generate distance information corresponding to Cell C12 based on ON information of Cell C12 and the travel time of the light sensed by the light detector 300. In this manner, the controller 400 may generate distance information corresponding to the plurality of cells, C11 Cnn, when the controller 400 controls the respective cells of the switch array 200 by having a time difference.

Figure 5:
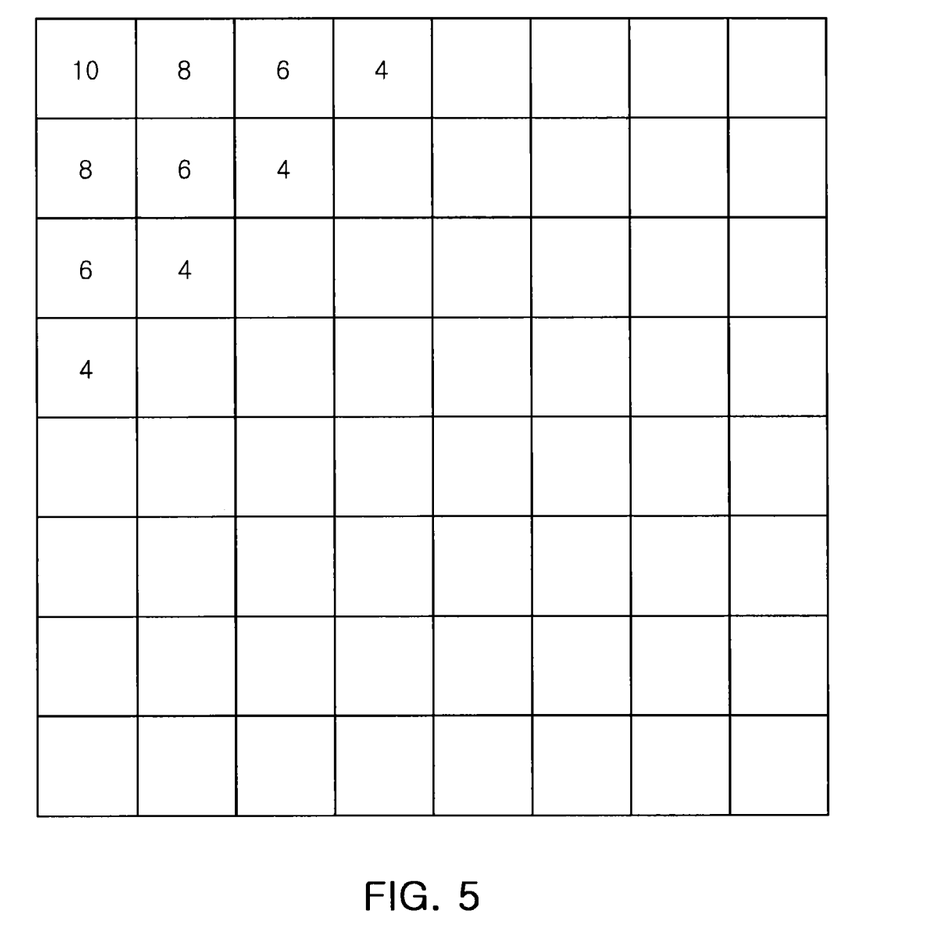
FIG. 5 is a view showing a plurality of pieces of distance information according to an embodiment of the present invention by using matrix-type distance information corresponding to the plurality of cells of the switch array.

FIG. 5 is a view showing a plurality of pieces of distance information according to an embodiment of the present invention by using matrix-type distance information corresponding to the plurality of cells of the switch array.

The controller 400 may convert the plurality of pieces of distance information into the matrix type distance information corresponding to the plurality of cells of the switch array 200. For example, when the controller controls the switch array including Cells C11~Cnn, the controller may generate a plurality of pieces of distance information corresponding to $n^2$ (=n×n). The controller 400 may generate a matrix having the same rows and columns as the plurality of cells of the switch array 200 controlled by the controller, and the distance information corresponding to each of the plurality of cells of the switch array 200 may be assigned to the matrix.

FIG. 5 shows a case in which a plurality of pieces of distance information, in which a distance corresponding to Cell C11 is 10; distances corresponding to Cells C21 and C12 are 8; distances corresponding to Cells C13, C22, and C31 are 6; distances corresponding to Cells C14, C23, C32, and C41 are 4; and distances corresponding to the other cells are 0 (distance information, 0, is not shown), are generated, and then the controller 400 assigns the above values to the matrix having the same rows and columns as the plurality of cells of the switch array 200 controlled by the controller 400.

Figure 6:
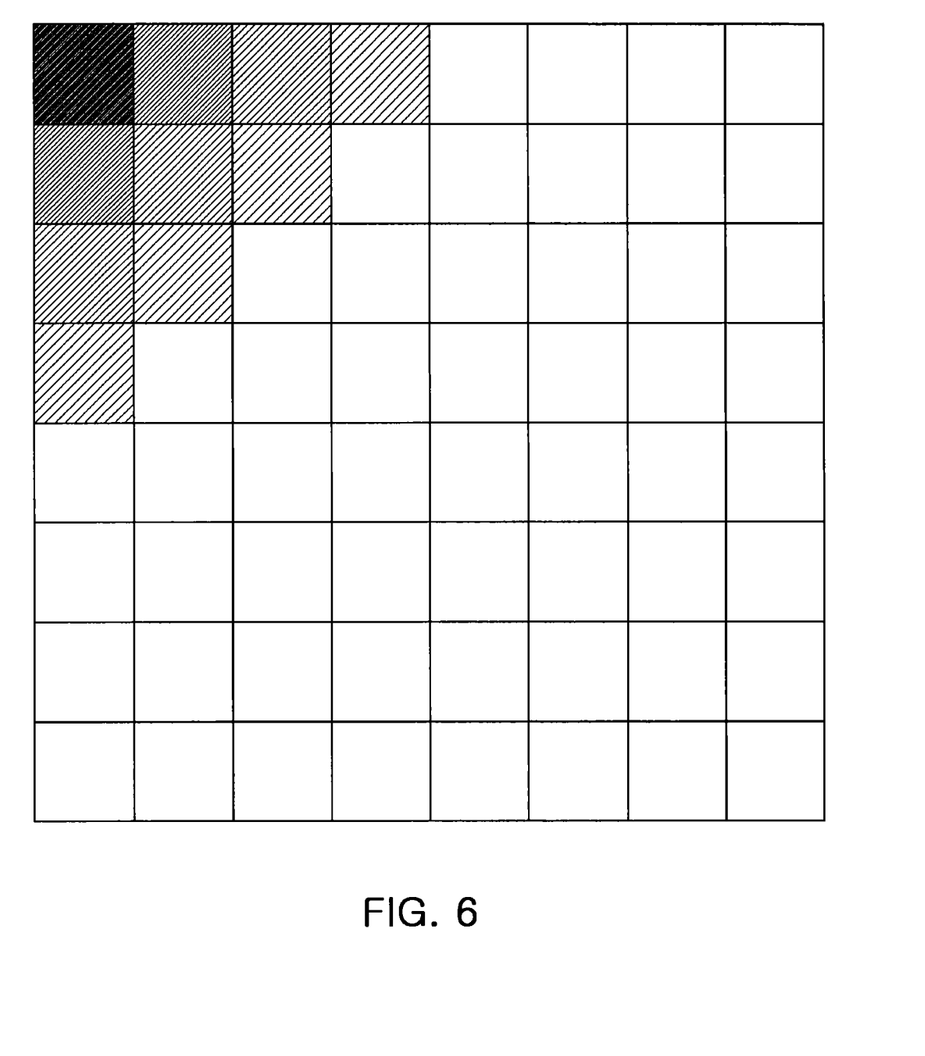
FIG. 6 is a view showing the matrix type distance information according to an embodiment of the present invention by using a predetermined gray scale corresponding to individual pieces of information among the plurality of pieces of distance information.

FIG. 6 is a view showing the matrix type distance information according to the embodiment of the present invention by using a predetermined gray scale corresponding to individual pieces of distance information among the plurality of pieces of distance information.

As described above, FIG. 5 shows a case in which a plurality of pieces of distance information, in which a distance corresponding to Cell C11 is 10; distances corresponding to Cells C21 and C12 are 8; distances corresponding to Cells C13, C22, and C31 are 6; distances corresponding to Cells C14, C23, C32, and C41 are 4; and distances corresponding to the other cells are 0, are generated, and then the controller 400 assigns the above values to the matrix having the same rows and columns as the plurality of cells of the switch array 200 controlled by the controller 400.

It can be seen from comparison between FIGS. 5 and 6, that FIG. 6 shows the matrix type distance information according to the embodiment of the present invention by using a predetermined gray scale corresponding to individual pieces of distance information among the plurality of pieces of distance information. Specifically, it can be seen that a cell in Row 1, Column 1, of which the distance is 10, has a higher gray scale than the other cells, and Cells in Row 1, Column 2 and Row 2, Column 1, of which the distances are 8, have a lower gray scale than the cell on Row 1 Column 1 but a higher gray scale than the other cells. In FIG. 6, a portion having a greater distance may be expressed to have a high gray scale, but is not limited thereto, and for example, a portion having a greater distance may be expressed to have a low gray scale.

In addition, the matrix type distance information may be expressed in predetermined colors corresponding to the respective pieces of distance information, by setting the respective distances correspondingly to different colors.

Hereinafter, a distance measurement method carried out by the distance measurement apparatus 10 shown in FIGS. 1 and 2 will be described with reference to a flow chart shown in FIG. 7.

Figure 7:
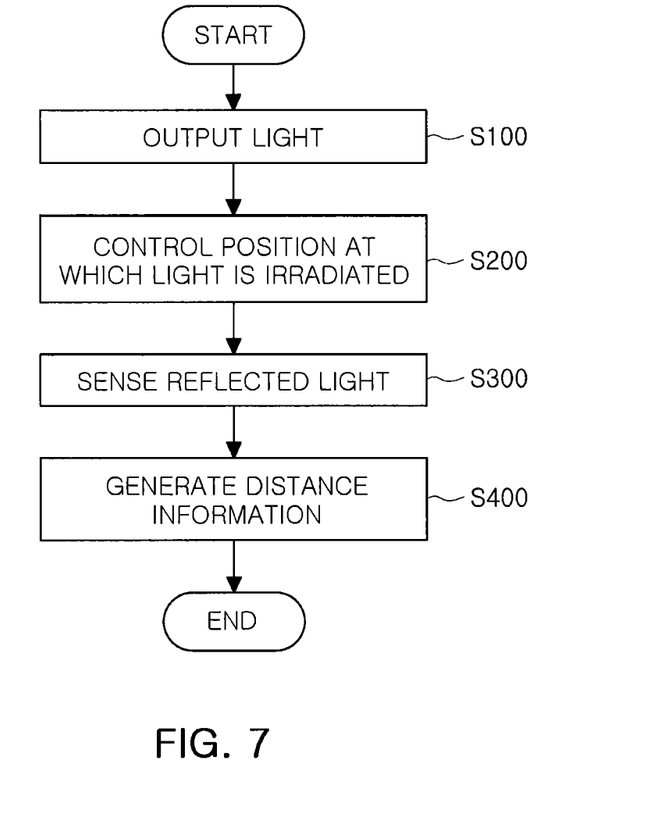
FIG. 7 is a flow chart showing a distance measurement method according to an embodiment of the present invention.

FIG. 7 is a flow chart showing a distance measurement method according to an embodiment of the present invention. Referring to FIG. 7, first, light is output from the light source 100 included in the distance measurement apparatus 10 according to an embodiment of the present invention (S100). A position at which the light output from the light source 100 is irradiated is controlled by switching operations of the plurality of cells of the switch array 200. The switching operations of the plurality of cells of the switch array 200 may be sequentially carried out by control of the controller 400 (S200). The light of which the irradiated position is controlled by the switch array 200 is run into the target object and then reflected and returned, and the reflected light is sensed by the light detector 300 (S300). The controller 400 may generate distance information about the target object reflecting the light, by using the light sensed by the light detector 300.

As set forth above, according to the embodiments of the present invention, the manufacturing costs and manufacturing costs per unit may be lowered by using a distance sensor including a single cell but not a distance sensor including a plurality of cells.

While the present invention has been shown and described in connection with the embodiments, it will be apparent to those skilled in the art that modifications and variations can be made without departing from the spirit and scope of the invention as defined by the appended claims.

What is claimed is:

1. A distance measurement apparatus, the apparatus comprising:
    a light source to output light;
    a switch array including a plurality of cells, and to control a position at which the light output from the light source is irradiated, by switching operations of respective cells of the plurality of cells of the switch array;
    a light detector including only a single cell, and to sense the light reflected from a target object; and
    a controller that sequentially controls the switching operations of the plurality of cells of the switch array,
    the controller to generate distance information corresponding to a distance between the light source and the target object, based on the light sensed by the light detector.

2. The apparatus of claim 1, wherein the controller controls the light source to be periodically switched on and off.

3. The apparatus of claim 2, wherein the controller synchronizes the switching operations of the plurality of cells of the switch array with an on and off operation of the light source, based on the on and off operation of the light source.

4. The apparatus of claim 1, wherein the controller generates the distance information based on a travel time of the light output from the light source and sensed by the light detector.

5. The apparatus of claim 4, wherein the controller generates a plurality of pieces of distance information based on a series of travel times of fragments of light output from the light source and sequentially sensed by the light detector and switching operation information of the plurality of cells of the switch array.

6. The apparatus of claim 5, wherein the controller converts the plurality of pieces of distance information into matrix-type distance information corresponding to the plurality of cells of the switch array.

7. The apparatus of claim 6, wherein the controller expresses the matrix type distance information by using a predetermined gray scale corresponding to individual pieces of distance information among the plurality of pieces of distance information.

8. A distance measurement method, the method comprising:
    outputting light from a light source;
    sensing, by a light detector including only a single cell, light reflected from a target object;
    sequentially controlling switching operation of a plurality of cells of a switch array to control a position at which the light output from the light source is irradiated, by switching operations of the respective cells of the plurality of cells of the switch array; and
    generating a piece of distance information corresponding to a distance between the light source and the target object, based on the light sensed by the light detector.

9. The method of claim 8, wherein the controlling of the switch array includes controlling the light source to be periodically switched on and off.

10. The method of claim 9, wherein the controlling of the switch array includes the switching operations of the plurality of cells of the switch array to be synchronized with the on and off operation of the light source based on the on and off operation of the light source.

11. The method of claim 8, wherein in the generating of the piece of distance information is based on a travel time of the light output from the light source to the light detector.

12. The method of claim 11, wherein the generating includes a plurality of pieces of distance information are generated based on a series of travel times of the fragments of light output from the light source and sequentially sensed by the light detector and switching operation information of the plurality of cells of the switch array.

13. The method of claim 12, wherein the generating includes the plurality of pieces of distance information are converted into matrix-type distance information corresponding to the plurality of cells of the switch array.

14. The method of claim 13, wherein the controlling includes the matrix type distance information is expressed by using a predetermined gray scale corresponding to individual pieces of distance information among the plurality of pieces of distance information.

* * * * *